US008736253B2

United States Patent
Huang et al.

(10) Patent No.: US 8,736,253 B2
(45) Date of Patent: May 27, 2014

(54) KILOWATT-HOUR METER WITH REMOTE ENVIRONMENT DETECT AND CONTROL

(75) Inventors: Min-Huang Huang, Taipei County (TW); Tung-Jung Wu, Keelung (TW)

(73) Assignee: Digipower Manufacturing Inc., Taipei (TW)

( * ) Notice: Subject to any disclaimer, the term of this patent is extended or adjusted under 35 U.S.C. 154(b) by 751 days.

(21) Appl. No.: 12/884,195

(22) Filed: Sep. 17, 2010

(65) Prior Publication Data

US 2011/0068774 A1  Mar. 24, 2011

(30) Foreign Application Priority Data

Sep. 21, 2009 (TW) .............................. 98217398 U

(51) Int. Cl.
*G01R 11/32* (2006.01)
(52) U.S. Cl.
USPC ......................................................... 324/142
(58) Field of Classification Search
CPC ............. G01R 21/133; G01R 21/1335; G01R 21/2509; G01D 4/004

USPC ............ 324/142, 762.01–762.1; 340/870.02; 361/659; 702/57

See application file for complete search history.

(56) References Cited

U.S. PATENT DOCUMENTS

| 2002/0074990 A1 * | 6/2002 | Shincovich | 324/110 |
| 2006/0033488 A1 * | 2/2006 | Gandhi | 324/142 |

* cited by examiner

*Primary Examiner* — Tung X Nguyen
(74) *Attorney, Agent, or Firm* — Jianq Chyun IP Office

(57) ABSTRACT

A kilowatt-hour meter with remote environment detect and control is provided. Besides calculating and display a quantity of used electricity through the kilowatt-hour meter, the kilowatt-hour meter with remote environment detect and control can also perform remote data collection and environment detect and control through an Ethernet. A plurality of the kilowatt-hour meters with remote environment detect and control can be connected through network connection, so as to detect and control situations related to safety of using electricity such as over current warning, environment state, access control, etc., for prompt processing.

26 Claims, 4 Drawing Sheets

KILOWATT-HOUR METER WITH REMOTE ENVIRONMENT DETECT AND CONTROL

CROSS-REFERENCE TO RELATED APPLICATION

This application claims the priority benefit of Taiwan application serial no. 98217398, filed on Sep. 21, 2009. The entirety of the above-mentioned patent application is hereby incorporated by reference herein and made a part of this specification.

BACKGROUND

1. Field of the Disclosure

The disclosure relates to a kilowatt-hour meter. More particularly, the disclosure relates to a kilowatt-hour meter with remote environment detect and control, which is capable of collecting electricity usage information, detecting environment and sending a warning message for safety of using electricity through an Ethernet.

2. Description of Related Art

Presently, all of electronic products have to use electricity for operation. Under a circumstance of limited energy resource, it is an important issue to effectively monitor electricity consumption and safety of using electricity.

A kilowatt-hour meter of the conventional technique only has a function of displaying accumulated electricity consumption, and does not have a function of operating a network environment or a function of detecting and controlling environment.

SUMMARY OF THE DISCLOSURE

The disclosure provides a kilowatt-hour meter with remote environment detect and control, which includes a microcontroller for processing all functions in the system. The microcontroller is connected to a display unit, and the display unit is capable of displaying network messages, for example, an Internet protocol (IP) address, a media access control (MAC) message, activation or inactivation of a dynamic host configuration protocol (DHCP) or a secure socket layer (SSL), a quantity of electricity (KWH and WH), an electric power, a power voltage, a load current, an environment state (temperature or humidity), a digital switch input state, a digital switch output state, so that a user is capable of obtaining required information without using other auxiliary devices.

In an embodiment of the disclosure, the kilowatt-hour meter with remote environment detect and control further includes an input device, and the input device is one of a keyboard and a touch screen device. Besides that electricity information of the system can be directly inquired and set through the input device, a network state can also be inquired and set through the input device.

In an embodiment of the disclosure, the kilowatt-hour meter with remote environment detect and control further includes a sound device. The sound device is, for example, a speaker controlled by power, and the sound device sends an indicating sound or a system warning sound according to a presetting, for example, sends a warning sound in case of an excessive current load.

In an embodiment of the disclosure, the kilowatt-hour meter with remote environment detect and control further includes an Ethernet port, and the Ethernet port is connected to a main system microcontroller. Information of the kilowatt-hour meter can be transmitted to an Ethernet through the Ethernet port, and a plurality of the kilowatt-hour meters can be simultaneously connected to the Ethernet. At least one monitor host is set to monitor the kilowatt-hour meters, so that time and money spent on collecting data of the kilowatt-hour meters are saved. In this way, information of electricity consumption of client ends can be collected and analysed, so as to control a load to achieve an energy-saving effect.

In an embodiment of the disclosure, the kilowatt-hour meter with remote environment detect and control further includes a microcontroller capable of calculating a voltage, a current, a power, a quantity of electricity consumption of a loop within the kilowatt-hour meter with remote environment detect and control, and the main system microcontroller is capable of monitoring the client ends through a high-voltage security isolation communication circuit and a serial communication multiplexing device.

In an embodiment of the disclosure, the kilowatt-hour meter with remote environment detect and control further includes an environment detection device port, which is connected to at least one environment detection device. The environment detection device is a temperature detector, a humidity detector, or other environment detectors (for example, an environment detector used for detecting carbon dioxide, etc.). The environment detection device transmits environment state information to the main system microcontroller through a serial communication multiplexing device for monitoring an environment state.

In an embodiment of the disclosure, the kilowatt-hour meter with remote environment detect and control further includes a website and parameter storage device, which is used for storing network system data, for example, a MAC, a website, and system parameters such as a current calibration data, etc.

In an embodiment of the disclosure, the kilowatt-hour meter with remote environment detect and control further includes a power device, which is used for supplying a direct current power to ensure an effective operation of the kilowatt-hour meter with remote environment detect and control.

In an embodiment of the disclosure, the kilowatt-hour meter with remote environment detect and control further includes a digital switch signal input port, which is used for inputting a digital switch signal, for example, an access control signal to the main system microcontroller, so that the main system microcontroller processes a security state of access control.

In an embodiment of the disclosure, the kilowatt-hour meter with remote environment detect and control further includes a digital switch signal output port, which is used for outputting a digital state signal, so as to control at least one device, for example, a fan or an air conditioner outside the kilowatt-hour meter with remote environment detect and control.

In an embodiment of the disclosure, the kilowatt-hour meter with remote environment detect and control further includes an overload cut-off detection circuit, which is used for providing a current breaker to cut off signals transmitted to the main system microcontroller, and when a current of a client end exceeds a rated range of the current breaker, the current breaker is turned off, and the main system microcontroller receives a cut off signal from the current breaker, and notifies the client end for handling.

In an embodiment of the disclosure, the kilowatt-hour meter with remote environment detect and control further includes a load current detection circuit, which is used for providing a load circuit signal to the main system processor for current calculation, so that at least one client end quickly obtains a load utilization state.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Reference will now be made in detail to the embodiments of the disclosure, examples of which are illustrated in the accompanying drawings.

Figure 1:
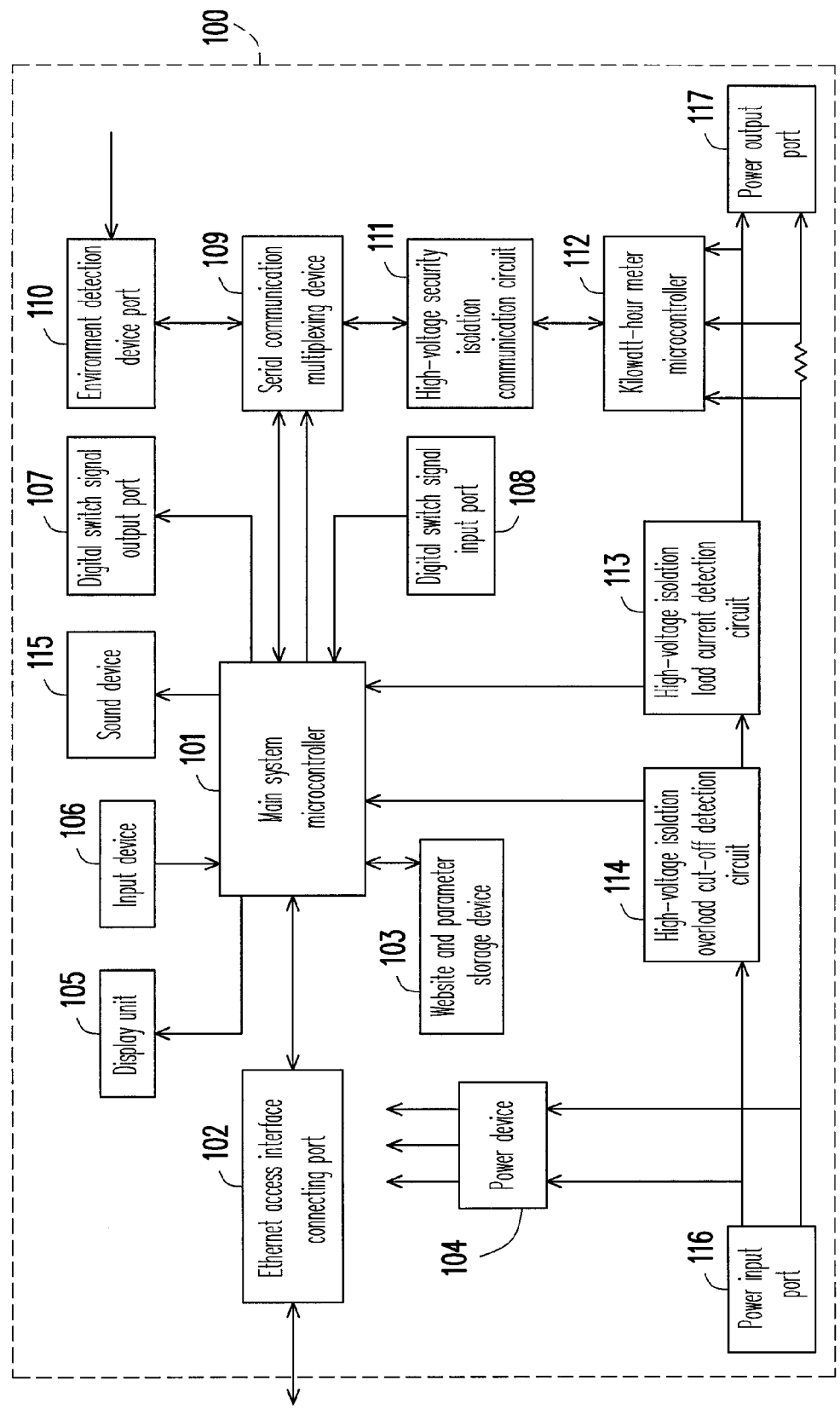
FIG. 1 is a circuit structure diagram of a kilowatt-hour meter with remote environment detect and control according to an embodiment of the disclosure.

Referring to FIG. 1, FIG. 1 is a circuit structure diagram of a kilowatt-hour meter 100 with remote environment detect and control according to an embodiment of the disclosure, and an operation method thereof is as follows.

A main system microcontroller 101 is in charge of processing all information of the system, and is connected to a serial communication multiplexing device 109. Based on a multiplex-switching operation of the serial communication multiplexing device 109, the main system microcontroller 101 can communicate with an environment detection device port 110 or communicate with a kilowatt-hour meter microcontroller 112 through a high-voltage security isolation communication circuit 111. When the main system microcontroller 101 selects to communicate with the environment detection device port 110, data (for example, environment temperature or humidity) detected by an environment detector connected to the environment detection device port 110 can be transmitted to the main system processor 101 through serial communication for processing. When the main system microcontroller 101 selects to communicate with the kilowatt-hour meter microcontroller 112, a calculation result of electricity consumption of a client can be transmitted to the main system processor 101 through serial communication for processing. The high-voltage security isolation communication circuit 111 functions as a high-voltage isolation between the main system microcontroller 101 and the kilowatt-hour meter microcontroller 112, so that the main system microcontroller 101 can perform serial communication under a secure low-voltage, so as to avoid a risk of high-voltage electric shock occurred to an operator.

The kilowatt-hour meter microcontroller 112 of the disclosure is connected to a power input terminal and a power output terminal The kilowatt-hour meter microcontroller 112 measures a voltage and a current to calculate a quantity of electricity used by a load end, and transmits data of the electricity quantity to the main system microcontroller 101 through the high-voltage security isolation communication circuit 111 for displaying or remote data monitoring processing.

The main system microcontroller 101 is connected to a digital switch signal output port 107. The digital switch signal output port 107 outputs a digital signal of a high level or a low level for driving an output device, for example, a door lock, etc, so that the main system microcontroller 101 can control some output devices according to instructions.

The main system microcontroller 101 is connected to a digital switch signal input port 108. The digital switch signal input port 108 may receive a digital signal of access control, and transmit it to the main system microcontroller 101 for processing. For example, when the door lock is unlocked, the main system microcontroller 101 may control a sound device 115 to send a warning sound.

The main system microcontroller 101 is connected to a display unit 105. The display unit 105 is composed of a seven-segment display and light-emitting diodes (LEDs), which can display reading values of voltage, current, quality of electricity, temperature and humidity, etc., and can also display state information of a network, such as an Internet protocol (IP), setting of a secure socket layer (SSL), setting of a dynamic host configuration protocol (DHCP), etc. In another embodiment of the disclosure, the display unit 105 is a set of LCD displays.

The main system microcontroller 101 is connected to an input device 106. The input device 106 is, for example, a button switch, which is used for inputting different functions, so that the display unit 105 may display reading values of voltage, current, quality of electricity, temperature and humidity, etc., and state information of a network, such as an Internet protocol (IP), setting of a secure socket layer (SSL), setting of a dynamic host configuration protocol (DHCP), etc.

The main system microcontroller 101 is connected to a system sound device 115. The system sound device 115 is, for example, a buzzer, which is used for sending an indicating sound during an operation of the system, or sending a warning sound when the system detects a dangerous situation.

The main system microcontroller 101 is connected to a website and parameter storage device 103. The website and parameter storage device 103 is, for example, a flash memory, which is used for storing website data, system setting parameters and calibration data of the kilowatt-hour meter. When the system needs these data, the system can fetch these data from the flash memory. Due to usage of the flash memory, when system power is turned off, the data stored in the flash memory can be maintained.

The main system microcontroller 101 is connected to a high-voltage isolation overload cut-off detection circuit 114. The high-voltage isolation overload cut-off detection circuit 114 is connected to a power input line. In case of an excessive output load current, a circuit breaker is tripped to cut off a power-normal signal, and when the main system microcontroller 101 cannot receive the power-normal signal, the main system microcontroller 101 sends a warning signal.

The main system microcontroller 101 is connected to a high-voltage isolation load current detection circuit 113, which is connected to a live line of the power input terminal, so that the main system microcontroller 101 can read and calculate a load current in real-time.

The main system microcontroller 101 is connected to an Ethernet access interface connecting port 102. The Ethernet access interface connecting port 102 includes a network physical layer (PHY). The main system microcontroller 101 can transmit data to a remote data collection system through the Ethernet access interface connecting port 102, so that the kilowatt-hour meter of the disclosure may have a remote environment detect and control function.

A power device 104 is connected to a power input port 116, and the power device 104 can convert an alternating current (AC) high-voltage power to a low-voltage power for supplying to various circuits of the disclosure.

Figure 2:
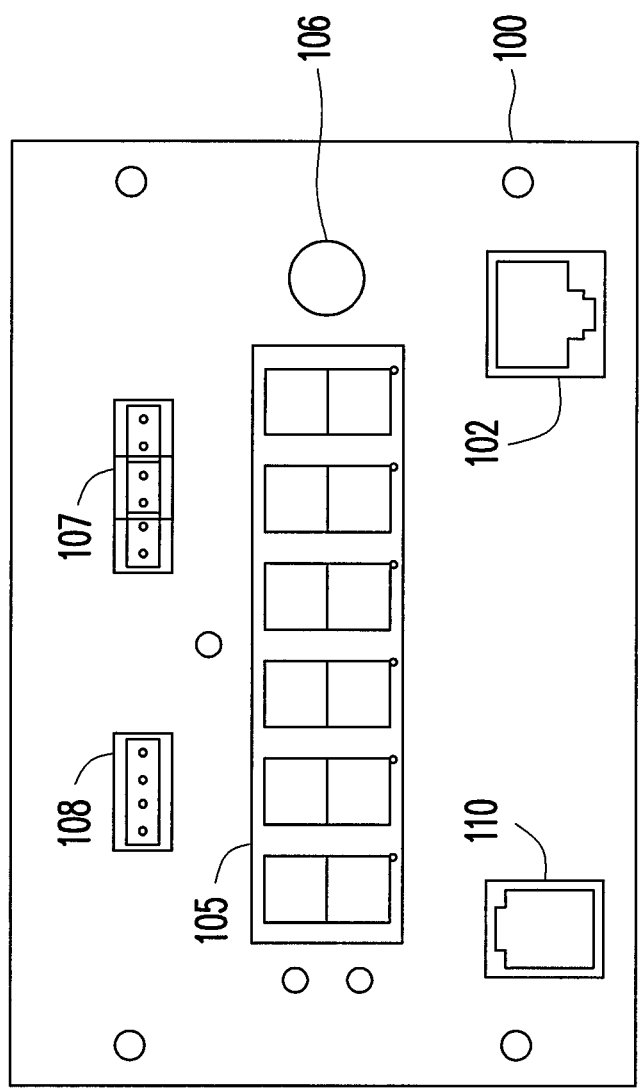
FIG. 2 is a top view of a kilowatt-hour meter with remote environment detect and control according to an embodiment of the disclosure.

Referring to FIG. 2, FIG. 2 is a top view of the kilowatt-hour meter 100 with remote environment detect and control according to an embodiment of the disclosure, in which the display unit 105, the digital switch signal output port 107, the digital switch signal input port 108, the input device 106, the Ethernet access interface connecting port 102 and the environment detection device port 110 are illustrated.

Figure 3:
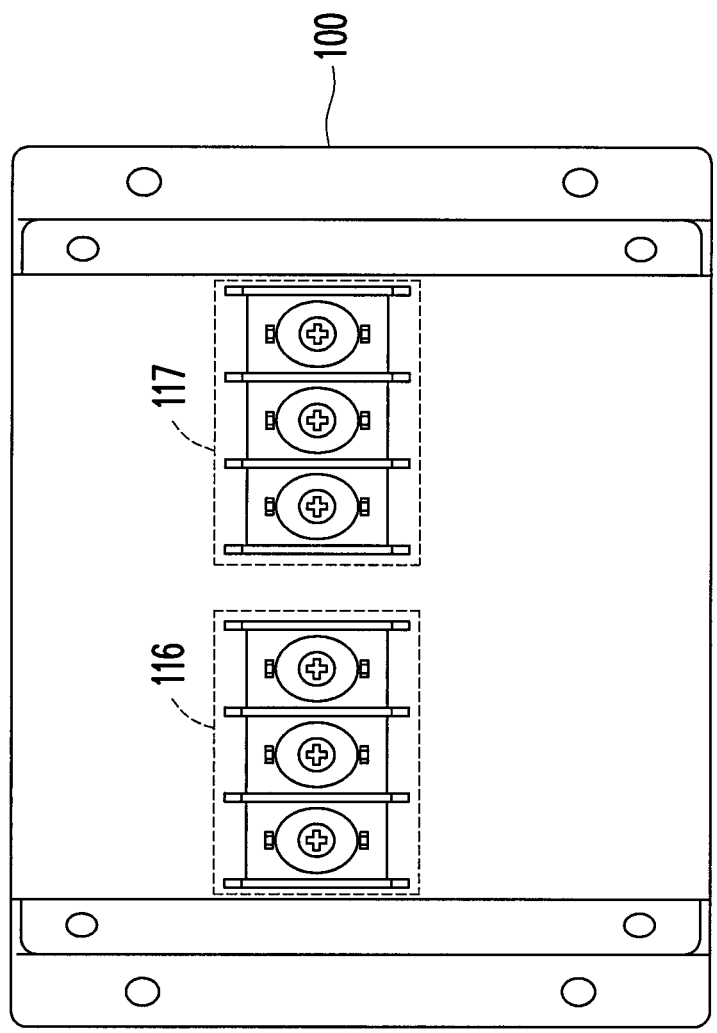
FIG. 3 is a bottom view of a kilowatt-hour meter with remote environment detect and control according to an embodiment of the disclosure.

Referring to FIG. 3, FIG. 3 is a bottom view of the kilowatt-hour meter 100 with remote environment detect and control according to an embodiment of the disclosure, in which the power input port 116 and the power output port 117 are illustrated.

Figure 4:
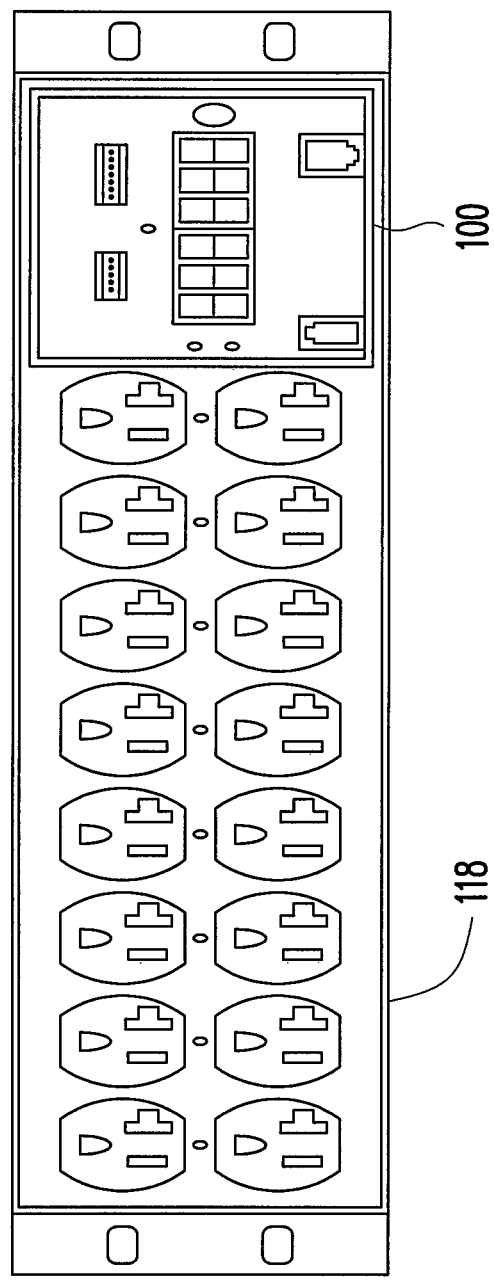
FIG. 4 is a diagram illustrating a combination of a kilowatt-hour meter with remote environment detect and control and a socket device according to an embodiment of the disclosure.

Referring to FIG. 4, FIG. 4 is a diagram illustrating a combination of the kilowatt-hour meter 100 with remote environment detect and control and a socket device 118 according to an embodiment of the disclosure.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A kilowatt-hour meter with remote environment detect and control, monitored and controlled by a computer through a network, and the kilowatt-hour meter with remote environment detect and control comprising:
a housing,
wherein at least one printed circuit board is embedded in the housing, the printed circuit board at least has a main system microcontroller, and the main system microcontroller is connected to a serial communication multiplexing device, a load current detection circuit, an overload cut-off detection circuit, a kilowatt-hour meter microcontroller, an environment detection device port and at least one connection port,
wherein the main system microcontroller selectively communicates with the kilowatt-hour meter microcontroller or the environment detection device port through the serial communication multiplexing device in a serial communication manner, and
wherein the kilowatt-hour meter microcontroller is connected to a power input port and a power output port and configured to calculate a quantity of the electricity and transmit the quantity of the electricity to the main system microcontroller.

2. The kilowatt-hour meter with remote environment detect and control as claimed in claim 1, further comprising a display unit.

3. The kilowatt-hour meter with remote environment detect and control as claimed in claim 2, wherein the display unit is used for displaying network state information.

4. The kilowatt-hour meter with remote environment detect and control as claimed in claim 3, wherein the display unit is used for displaying an Internet protocol (IP) address.

5. The kilowatt-hour meter with remote environment detect and control as claimed in claim 3, wherein the display unit is used for displaying a media access control (MAC) message.

6. The kilowatt-hour meter with remote environment detect and control as claimed in claim 3, wherein the display unit is used for displaying activation of a dynamic host configuration protocol (DHCP) or inactivation of the DHCP.

7. The kilowatt-hour meter with remote environment detect and control as claimed in claim 3, wherein the display unit is used for displaying activation of a secure socket layer (SSL) or inactivation of the SSL.

8. The kilowatt-hour meter with remote environment detect and control as claimed in claim 2, wherein the display unit is a seven-segment light-emitting diode (LED) display, and is used for displaying one of an IP address, a quantity of electricity, an electric power, a power voltage, a load current, an environment state, a digital switch input state and a digital switch output state.

9. The kilowatt-hour meter with remote environment detect and control as claimed in claim 8, wherein the environment state is one of a temperature and humidity.

10. The kilowatt-hour meter with remote environment detect and control as claimed in claim 2, wherein the display unit is a set of LEDs, and is used for displaying a DHCP state and a SSL state.

11. The kilowatt-hour meter with remote environment detect and control as claimed in claim 2, wherein the display unit is a set of LED displays or LCD displays, and is used for displaying one of an IP address, a quantity of electricity, an electric power, a power voltage, a load current, an environment state, a digital switch input state, a digital switch output state, a setting result of DHCP and a setting result of SSL.

12. The kilowatt-hour meter with remote environment detect and control as claimed in claim 1, wherein an environmental detector is connected to the environment detection device port to detect an environmental temperature or an environmental humidity.

13. The kilowatt-hour meter with remote environment detect and control as claimed in claim 1, further comprising an input device.

14. The kilowatt-hour meter with remote environment detect and control as claimed in claim 13, wherein the input device is one of a keyboard or a touch screen device.

15. The kilowatt-hour meter with remote environment detect and control as claimed in claim 13, wherein the input device is operated to display one of an IP address, a DHCP state, a SSL state, a quantity of electricity, an electric power, a power voltage, a load current, an environment state, a digital switch input state and a digital switch output state.

16. The kilowatt-hour meter with remote environment detect and control as claimed in claim 1, further comprising a sound device.

17. The kilowatt-hour meter with remote environment detect and control as claimed in claim 16, wherein the sound device is one of a controllable buzzer and a speaker, and is used for sending a sound.

18. The kilowatt-hour meter with remote environment detect and control as claimed in claim 16, wherein the sound device sends a warning sound when a current exceeds a rated range or a current overload breaker is activated.

19. The kilowatt-hour meter with remote environment detect and control as claimed in claim 1, wherein the kilowatt-hour meter with remote environment detect and control is further combined with a socket device.

20. The kilowatt-hour meter with remote environment detect and control as claimed in claim 1, wherein the connection port is an Ethernet port.

21. The kilowatt-hour meter with remote environment detect and control as claimed in claim 20, wherein the Ethernet port is connected to at least one kilowatt-hour meter with remote environment detect and control through at least one Ethernet.

22. The kilowatt-hour meter with remote environment detect and control as claimed in claim 1, wherein the connection port is a digital switch signal output port.

23. The kilowatt-hour meter with remote environment detect and control as claimed in claim 1, wherein the connection port is a digital switch signal input port.

24. The kilowatt-hour meter with remote environment detect and control as claimed in claim 1, wherein the connection port is an environment detection device port.

25. The kilowatt-hour meter with remote environment detect and control as claimed in claim 1, wherein the printed circuit board further includes a storage device.

26. The kilowatt-hour meter with remote environment detect and control as claimed in claim 25, wherein the storage device is used for storing one of system parameters, calibration data of the kilowatt-hour meter with remote environment detect and control, network MAC and website data.

\* \* \* \* \*